(12) United States Patent
Conway et al.

(10) Patent No.: US 9,537,781 B2
(45) Date of Patent: *Jan. 3, 2017

(54) METHOD AND SYSTEM FOR EXTENDED REACH COPPER TRANSCEIVER

(71) Applicant: Broadcom Corporation, Irvine, CA (US)

(72) Inventors: Bruce Conway, Aliso Viejo, CA (US); Minshine Shih, Irvine, CA (US); Scott Powell, Aliso Viejo, CA (US); Ali Abaye, Irvine, CA (US); Seyed Hamidi, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/137,831

(22) Filed: Dec. 20, 2013

(65) Prior Publication Data

US 2014/0105014 A1    Apr. 17, 2014

Related U.S. Application Data

(63) Continuation of application No. 13/551,061, filed on Jul. 17, 2012, now Pat. No. 8,654,636, which is a (Continued)

(51) Int. Cl.
*H04B 3/23* (2006.01)
*H04B 3/32* (2006.01)
(Continued)

(52) U.S. Cl.
CPC .............. *H04L 47/25* (2013.01); *H04B 3/23* (2013.01); *H04B 3/32* (2013.01); *H04L 5/1446* (2013.01);
(Continued)

(58) Field of Classification Search
CPC ............ H04B 3/32; H04L 47/25; Y02B 60/31
(Continued)

(56) References Cited

U.S. PATENT DOCUMENTS 5,541,957 A * 7/1996 Lau .................... H04L 12/40136
375/257
6,529,957 B1 * 3/2003 Joergensen .................... 709/233
(Continued)

*Primary Examiner* — Xavier S. Wong
(74) *Attorney, Agent, or Firm* — Oblon, McClelland, Maier & Neustadt, L.L.P.

(57) ABSTRACT

Aspects of a method and system for an extended range copper transceiver are provided. Reducing the communication rate provided by multi-rate physical (PHY) layer operations in an Ethernet transceiver may extend the range of the Ethernet transceiver over twisted-pair copper cabling from a standard connection length. The Ethernet transceiver may support up to 1 Gbps or up to 10 Gbps transmission rate over copper cabling. The multi-rate PHY layer architecture in the Ethernet transceiver may support signal-processing operations, such as echo cancellation and/or equalization, which may be applied to the reduced communication rate to enable range extension. The reduced communication rate may be achieved by reducing the symbol rate provided by the multi-rate PHY layer operations. Reducing the communication rate may also enable utilizing greater insertion loss cabling for a standard connection length.

20 Claims, 11 Drawing Sheets

Related U.S. Application Data continuation of application No. 11/473,205, filed on Jun. 22, 2006, now Pat. No. 8,228,795.

(60) Provisional application No. 60/793,102, filed on Apr. 19, 2006.

(51) Int. Cl.
*H04L 5/14* (2006.01)
*H04L 12/825* (2013.01)
*H04L 1/00* (2006.01)

(52) U.S. Cl.
CPC ............ *H04L 1/0036* (2013.01); *H04L 1/0054* (2013.01); *Y02B 60/31* (2013.01)

(58) Field of Classification Search
USPC .................................. 370/241–255, 465–473
See application file for complete search history.

(56) References Cited

U.S. PATENT DOCUMENTS

| | | | | |
|---|---|---|---|---|
| 7,356,047 | B1* | 4/2008 | Mahalawat et al. | 370/469 |
| 7,701,092 | B1* | 4/2010 | Parker et al. | 307/154 |
| 7,817,767 | B2* | 10/2010 | Tell | H03L 7/0814 375/236 |
| 8,228,795 | B2* | 7/2012 | Conway | H04B 3/23 370/230.1 |
| 8,619,950 | B1* | 12/2013 | Feldstein et al. | 379/93.01 |
| 8,654,636 | B2* | 2/2014 | Conway | H04B 3/23 370/230.1 |
| 2003/0091053 | A1* | 5/2003 | Tzannes et al. | 370/395.1 |
| 2003/0108093 | A1* | 6/2003 | Lai et al. | 375/222 |
| 2004/0247022 | A1* | 12/2004 | Raghavan et al. | 375/219 |
| 2007/0121663 | A1* | 5/2007 | Yousefi et al. | 370/446 |
| 2008/0036558 | A1* | 2/2008 | Suarez-Gartner et al. | 333/239 |

\* cited by examiner

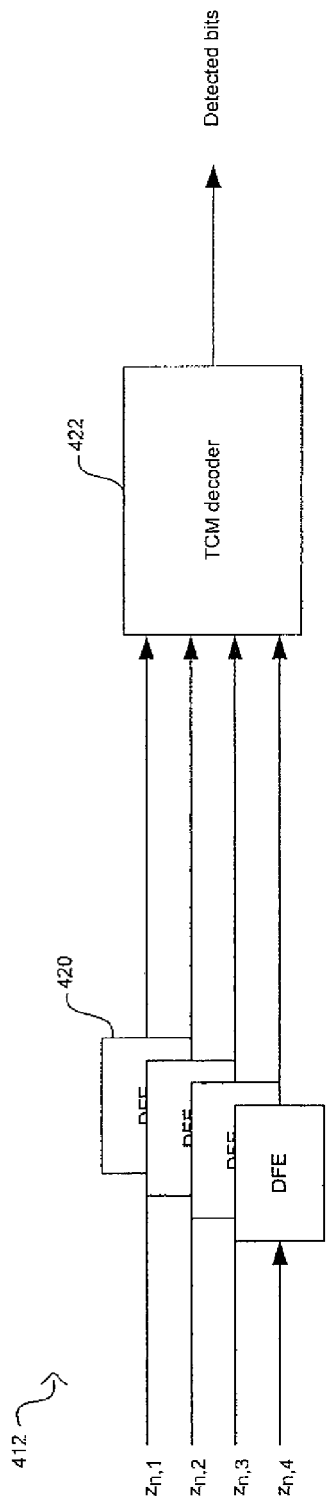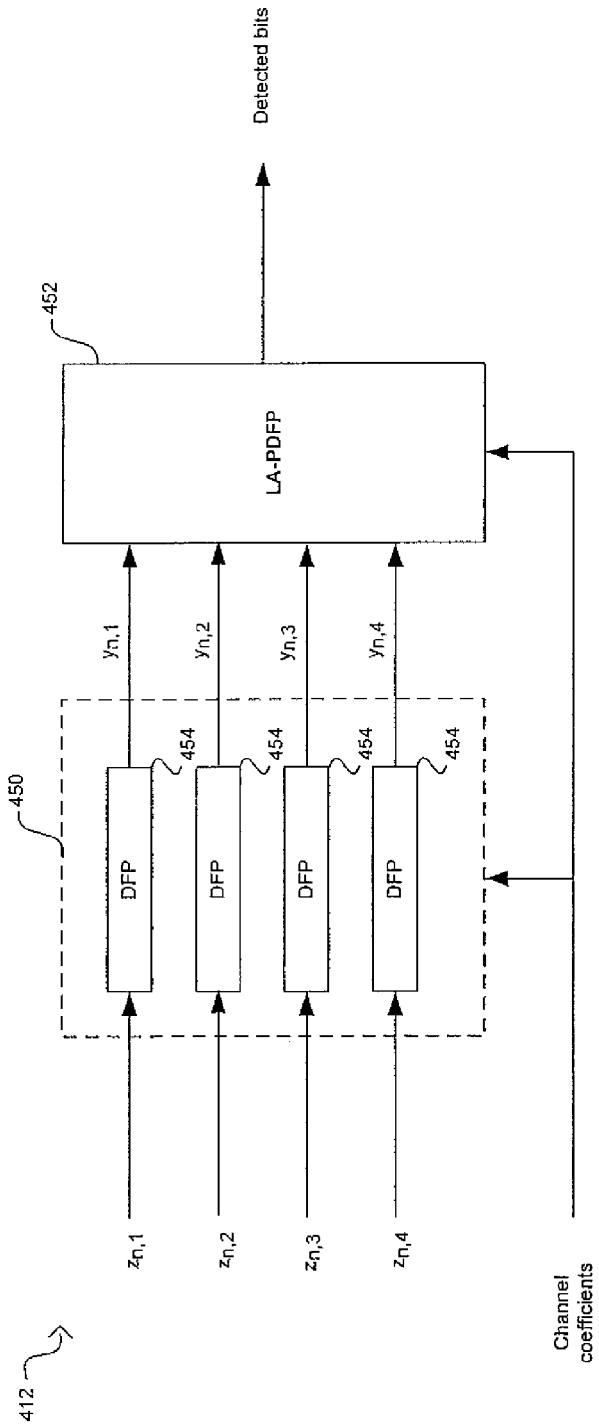
FIG. 4B
FIG. 4C

METHOD AND SYSTEM FOR EXTENDED REACH COPPER TRANSCEIVER

CROSS-REFERENCE TO RELATED APPLICATIONS/INCORPORATION BY REFERENCE

This application is a continuation of U.S. application Ser. No. 13/551,061, filed Jul. 17, 2012, which is a continuation of U.S. application Ser. No. 11/473,205, filed Jun. 22, 2006, which makes reference to, claims priority to, and claims benefit of U.S. Provisional Application Ser. No. 60/793,102 filed on Apr. 19, 2006, which is hereby incorporated by reference in its entirety.

The above stated application is hereby incorporated by reference in its entirety.

FIELD OF THE INVENTION

Certain embodiments of the invention relate to high-speed wired communication. More specifically, certain embodiments of the invention relate to a method and system for an extended range copper transceiver.

BACKGROUND OF THE INVENTION

As the number of devices connected to data networks increase and higher data rates are required, there is a growing need for new transmission technologies enabling higher transmission rates over existing copper cabling infrastructures. Various efforts exist in this regard, including technologies that enable transmission rates that may even exceed Gigabits-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. However, connections longer than 100 m may require either the use of fiber or the placement of Ethernet switches, hubs, and/or repeaters, at mid-points in the connection to keep all cables less than 100 m in length.

Other efforts include the development of a standard for 10 Gigabits-per-second (Gbps) Ethernet transmission over twisted-pair cabling (10 GBASE-T). The emerging 10 GBASE-T PHY specification is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. Moreover, new cabling specifications are being developed to diminish susceptibility to external electro-magnetic interferences.

Extending the range of standard based Ethernet PHY devices with minimal changes to the PHY transceiver architectures that support 1 Gbps or 10 Gbps data rates, may enable new Ethernet PHY devices to be used and deployed in the broadband access market and possibly in new residential and enterprise applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an extended range copper transceiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4B is a block diagram illustrating exemplary separate equalization and decoding operations for Gigabit Ethernet as described in FIG. 4A, in connection with an embodiment of the invention.

FIG. 4C is a block diagram illustrating exemplary joint equalization and decoding operations for Gigabit Ethernet as described in FIG. 4A, in connection with an embodiment of the invention.

DETAILED DESCRIPTION OF THE INVENTION

Certain embodiments of the invention may be found in a method and system for an extended range copper transceiver. Aspects of the invention may comprise reducing the communication rate provided by multi-rate physical (PHY) layer operations in an Ethernet transceiver to extend the range of the Ethernet transceiver over twisted-pair copper cabling to a connection length that may be longer than a standard connection length. The Ethernet transceiver may support up to 1 Gbps or up to 10 Gbps transmission rate over copper cabling. The architecture of the multi-rate PHY layer operations in the Ethernet transceiver may support signal-processing operations, such as echo cancellation and/or equalization, for example, which may be applied to the reduced communication rate to enable range extension. The reduced communication rate may be achieved by reducing the symbol rate provided by the multi-rate PHY layer operations in the Ethernet transceiver. Reducing the communication rate may also enable utilizing higher insertion loss cabling for a standard connection length.

Figure 1:
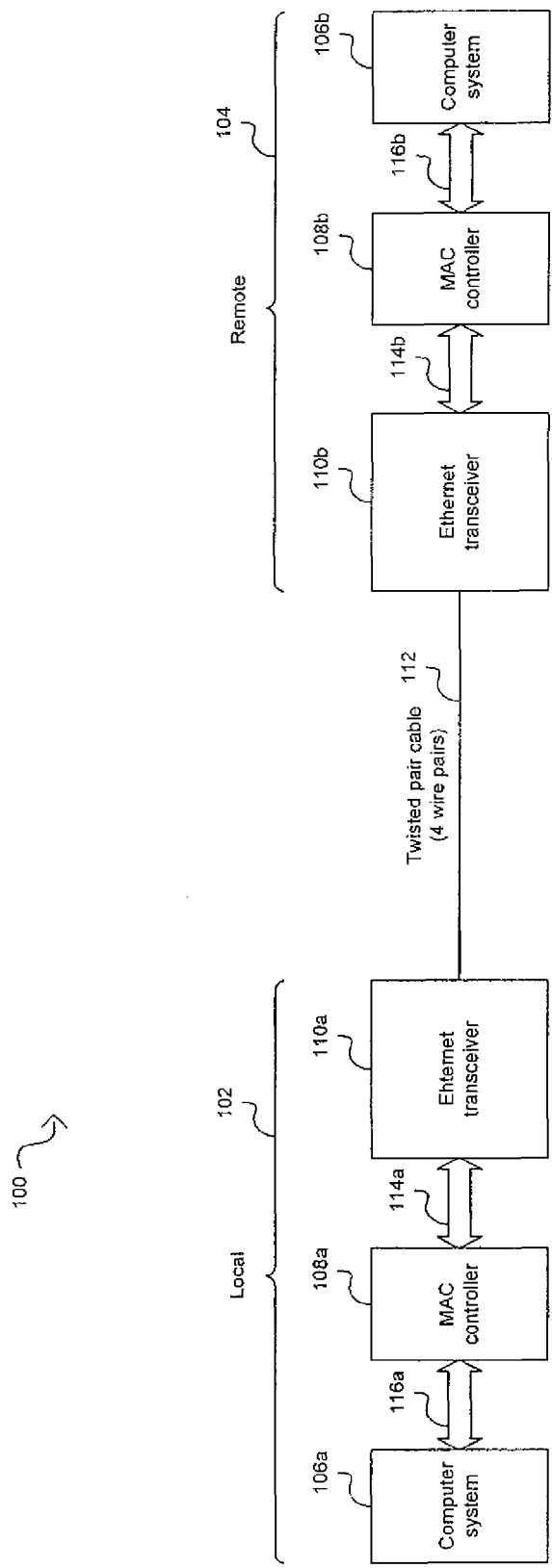
FIG. 1 is a block diagram illustrating an Ethernet over twisted-pair cabling link between a local link partner and a remote link partner, in connection with an embodiment of the invention.

FIG. 1 is a block diagram illustrating an Ethernet over twisted-pair cabling link between a local link partner and a remote link partner, in connection with an embodiment of the invention. Referring to FIG. 1, there is shown a system 100 that comprises a local link partner 102 and a remote link partner 104. The local link partner 102 and the remote link partner 104 communicate via a cable 112. The cable 112 may be a 4-pair unshielded twisted-pair (UTP) copper cabling, for example. Certain performance and/or specifications criteria for UTP copper cabling have been standardized. For example, Category 3 cabling may provide the necessary performance for 10 Mbps Ethernet transmissions over twisted-pair cabling (10BASE-T). In another example, Category 5 cabling may provide the necessary performance for 1000 Mbps, or Gbps, Ethernet transmissions over twisted-pair cabling (1000BASE-T). In most instances, a lower category cable may generally have a greater insertion loss than a higher category cable.

The local link partner 102 comprises a computer system 106a, a medium access control (MAC) controller 108a, and a transceiver 104a. The remote link partner 104 comprises a computer system 106b, a MAC controller 108b, and a transceiver 110b. Notwithstanding, the invention is not limited in this regard.

The transceiver 110a comprises suitable logic, circuitry, and/or code that may enable communication, for example, transmission and reception of data, between the local link partner 102 and a link partner, such as the remote link partner 104, for example. Similarly, the transceiver 110b comprises suitable logic, circuitry, and/or code that may enable communication between the remote link partner 104 and a link partner, such as the local link partner 102, for example. The transceivers 110a and 110b may enable multi-rate communications, such as 10 Mbps, 100 Mbps, 1000 Mbps (or 1 Gbps) and/or 10 Gbps, for example. In this regard, the transceivers 110a and 110b may support standard-based data rates and/or non-standard data rates. The transceivers 110a and 110b may utilize multilevel signaling. In this regard, the transceivers 110a and 110b may utilize pulse amplitude modulation (PAM) with various levels to represent the various symbols to be transmitted. For example, for 1000 Mbps Ethernet applications, a PAM5 transmission scheme may be utilized in each twisted-pair wire, where PAM5 refers to PAM with five levels {-2, -1, 0, 1, 2}.

The data transmitted and/or received by the transceivers 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical (PHY) layer, may provide services to layer 2 and layer 2 may provide services to layer 3.

In the embodiment of the invention illustrated in FIG. 1, the computer systems 106a and 106b may represent layer 3 and above, the MAC controllers 108a and 108b may represent layer 2 and above and the transceivers 110a and 110b may represent the operability and/or functionality of layer 1 or the PHY layer. In this regard, the computer systems 106a and 106b comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the computer systems 106a and 106b to ensure that packets are suitably formatted and communicated to the transceivers 110a and 110b. During transmission, each layer adds its own header to the data passed on from the interfacing layer above it. However, during reception, a compatible device having a similar OSI stack strips off the headers as the message passes from the lower layers up to the higher layers.

The transceivers 110a and 110b may be configured to handle all the physical layer requirements, which include, but are not limited to, packetization, data transfer and serialization/deserialization (SERDES), in instances where such an operation is required. Data packets received by the transceivers 110a and 110b from MAC controllers 108a and 108b, respectively, may include data and header information for each of the above six functional layers. The transceivers 110a and 110b may be configured to encode data packets that are to be transmitted over the cable 112 and/or to decode data packets received from the cable 112.

The MAC controller 108a comprises suitable logic, circuitry, and/or code that may enable handling of data link layer, layer 2, operability and/or functionality in the local link partner 102. Similarly, the MAC controller 108b comprises suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the transceiver 110a via an interface 114a and with the computer system 106a via a bus controller interface 116a. The MAC controller 108b may communicate with the transceiver 110b via an interface 114b and with the computer system 106b via a bus controller interface 116b. The interfaces 114a and 114b correspond to Ethernet interfaces that comprise protocol and/or link management control signals. The interfaces 114a and 114b may be multi-rate interfaces. The bus controller interfaces 116a and 116b may correspond to PCI or PCI-X interfaces. Notwithstanding, the invention is not limited in this regard.

Figure 2:
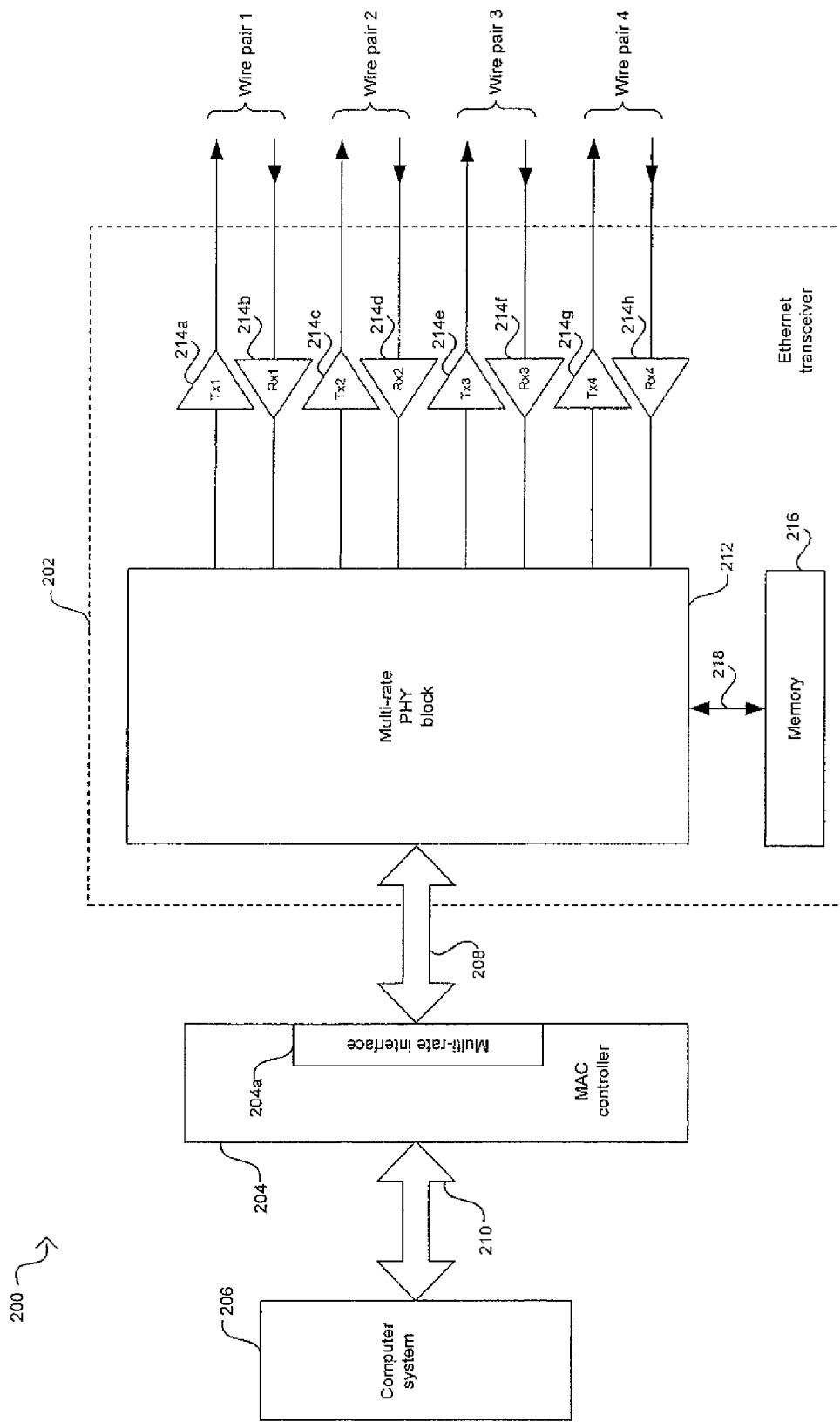
FIG. 2 is a block diagram illustrating an exemplary Ethernet transceiver multi-rate PHY layer architecture, in accordance with an embodiment of the invention.

FIG. 2 is a block diagram illustrating an exemplary Ethernet transceiver multi-rate PHY layer architecture, in accordance with an embodiment of the invention. Referring to FIG. 2, there is shown a link partner 200 that comprises a transceiver 202, a MAC controller 204, a computer system 206, an interface 208, and a bus controller interface 210. The transceiver 202 may be an integrated device that comprises a multi-rate PHY block 212, a plurality of transmitters 214a, 214c, 214e, and 214g, a plurality of receivers 214b, 214d, 214*f*, and 214*h*, a memory 216, and a memory interface 218. The operation of the transceiver 202 may be the same as or substantially similar to the transceivers 110*a* and 110*b* as described in FIG. 1. In this regard, the transceiver 202 may provide layer 1 or PHY layer operability and/or functionality. Similarly, the operation of the MAC controller 204, the computer system 206, the interface 208, and the bus controller 210 may be the same as or substantially similar to the respective MAC controllers 108*a* and 108*b*, computer systems 106*a* and 106*b*, interfaces 114*a* and 114*b*, and bus controller interfaces 116*a* and 116*b* as described in FIG. 1. The MAC controller 204 may comprise a multi-rate interface 204*a* that may comprise suitable logic, circuitry, and/or code to enable communication with the transceiver 202 at a plurality of data rates via the interface 208.

The multi-rate PHY block 212 in the transceiver 202 comprises suitable logic, circuitry, and/or code that may enable operability and/or functionality of PHY layer requirements. The multi-rate PHY block 212 communicates with the MAC controller 204 via the interface 208. In one aspect of the invention, the interface 208 may be configured to utilize a plurality of serial data lanes for receiving data from the multi-rate PHY block 212 and/or for transmitting data to the multi-rate PHY block 212, in order to achieve higher operational speeds such as Gbps or 10 Gbps, for example. The multi-rate PHY block 212 may be configured to operate in one or more of a plurality of communication modes, where each communication mode implements a different communication protocol. These communication modes may include, but are not limited to, IEEE 802.3, 10 GBASE-T and other similar protocols. The multi-rate PHY block 212 may be configured to operate in a particular mode of operation upon initialization or during operation. The multi-rate PHY block 212 may also be configured to operate in an extended range mode.

In some instances, an auto-negotiation scheme may be utilized by the transceiver 202 to indicate or communicate to a remote link partner that the transceiver 202 is operating in an extended range mode. The remote link partner may then configure itself to the appropriate extended range mode. Through standard auto-negotiation, a network link may be configured as an extended range from only one end of the link, ensuring interoperability between extended range enabled Ethernet transceivers and legacy devices. In some instances, the link may be pre-configured and the transceivers fixed in an extended range mode.

The multi-rate PHY block 212 may be coupled to memory 216 through the memory interface 218, which may be implemented as a serial interface or a bus. The memory 216 comprises suitable logic, circuitry, and/or code that may enable storage or programming of information that includes parameters and/or code that may effectuate the operation of the multi-rate PHY block 212. The parameters may comprise configuration data and the code may comprise operational code such as software and/or firmware, but the information need not limited in this regard. Moreover, the parameters may include adaptive filter and/or block coefficients for use by the multi-rate PHY block 212, for example.

The transmitters 214*a*, 214*c*, 214*e*, and 214*g* may comprise suitable logic, circuitry, and/or code that may enable transmission of data from the link partner 200 to a remote link partner via the cable 212 in FIG. 1, for example. The receivers 214*b*, 214*d*, 214*f*, and 214*h* may comprise suitable logic, circuitry, and/or code that may enable receiving data from a remote link partner by the link partner 200. Each of the four pairs of transmitters and receivers in the transceiver 202 correspond to one of the four wires in the cable 212. For example, transceiver 214*a* and receiver 214*b* are utilized to communicate with a remote link partner via the first wire pair in the cable 212. Similarly, transceiver 214*g* and receiver 214*h* may be utilized to communicate with a remote link partner via the fourth wire pair in the cable 212. In this regard, at least one of the four transceiver/receiver pairs may be enabled to provide the appropriate communication rate.

Figure 3:
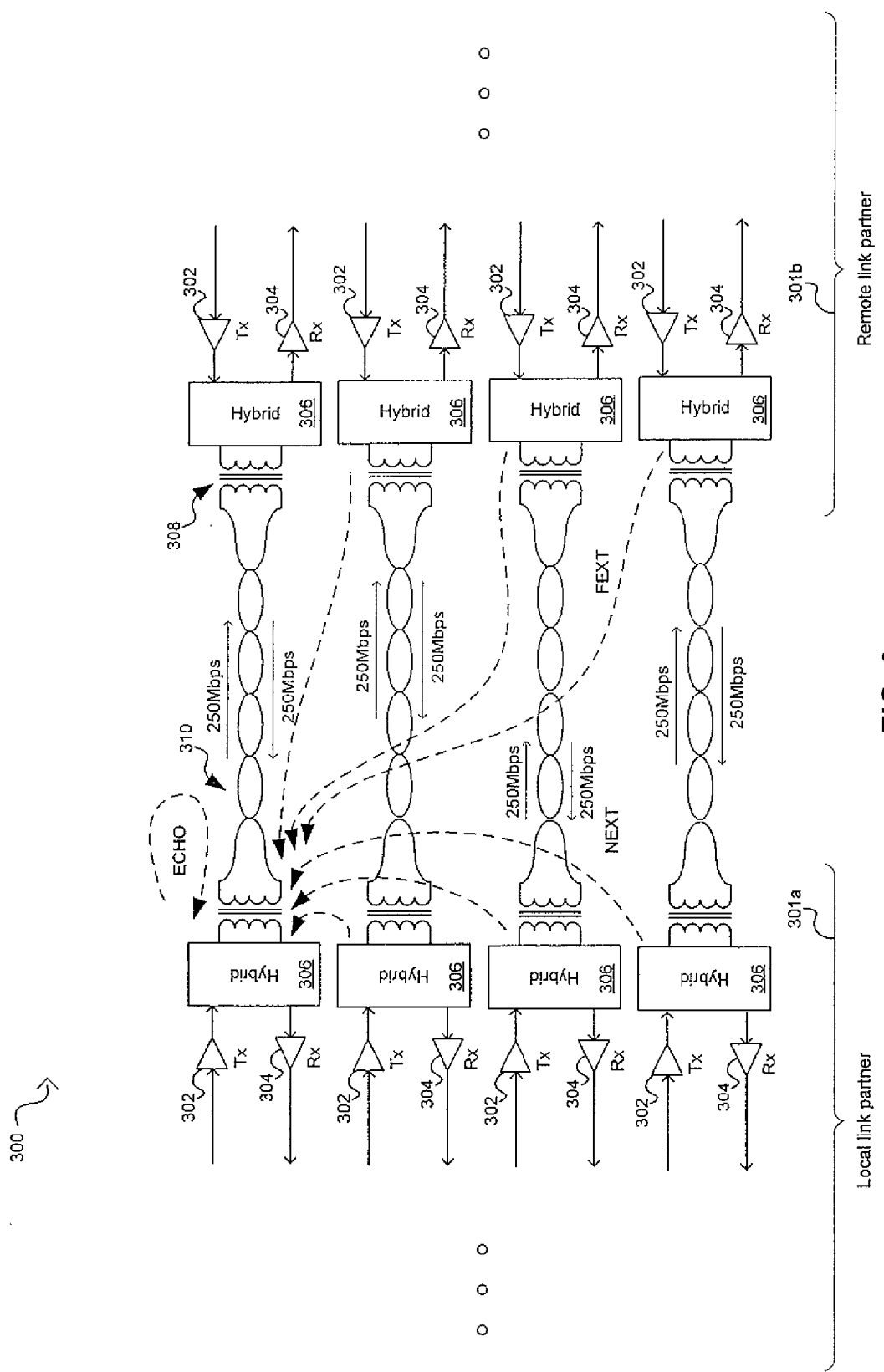
FIG. 3 is a block diagram illustrating ECHO, NEXT, and FEXT channel conditions in a Gigabit Ethernet system, in connection with an embodiment of the invention.

FIG. 3 is a block diagram illustrating ECHO, NEXT, and FEXT channel conditions in a Gigabit Ethernet system, in connection with an embodiment of the invention. Referring to FIG. 3, there is shown a Gigabit Ethernet system 300 that may comprise a local link partner 301*a* and a remote link partner 301*b*. The local link partner 301*a* and the remote link partner 301*b* may communicate via four twisted-pair wires 310 in full duplex operation. Each of the four twisted-pair wires 310 may support 250 Mbps data rates to provide an aggregate data rate of 1 Gbps. The local link partner 301*a* may comprise four hybrids 306. Each hybrid 306 in the local link partner 301*a* may be communicatively coupled to a transmitter 302, a receiver 304, and to one of the four twisted-pair wires 310. Similarly, the remote link partner 301*b* may comprise four hybrids 306. Each hybrid 306 in the remote link partner 301*b* may be communicatively coupled to a transmitter 302, a receiver 304, and to one of the four twisted-pair wires 310. The portions of the local link partner 301*a* and the remote link partner 301*b* shown in FIG. 3 may correspond to a portion of the physical (PHY) layer operations supported by the local link partner 301*a* and remote link partner 301*b* respectively.

Each hybrid 306 in the local link partner 301*a* or the remote link partner 301*b* may be communicatively coupled to or comprise a transformer 308. The hybrid 306 may comprise suitable logic, circuitry, and/or code that may enable separating the transmitted and received signals from a twisted-pair wire 310. The transmitters 302 may comprise suitable logic, circuitry, and/or code that may enable generating signals to be transmitted to a link partner at the other end of the link via a hybrid 306 and a twisted-pair wire 310. The receivers 304 may comprise suitable logic, circuitry, and/or code that may enable processing signals received from a link partner at the other end of the link via a twisted-pair wire 310 and a hybrid 306.

During operation, several conditions may occur in each of the twisted-pair wires 310. For example, intersymbol interference (ISI) may occur as a result of frequency dependent wire attenuation. As shown in FIG. 3, an ECHO component may be received in a twisted-pair wire 310 from an echo that results from the local transmitter 302 on the same twisted-pair wire 310. A near-end crosstalk (NEXT) component may also be received in a twisted-pair wire 310 from the local transmitters 302 corresponding to the three adjacent twisted-pair wires 310 in the same link partner. Moreover, a far-end crosstalk (FEXT) component may also be received in a twisted-pair wire 310 from the remote transmitters 302 in the link partner at the other end of the link.

Figure 4A:
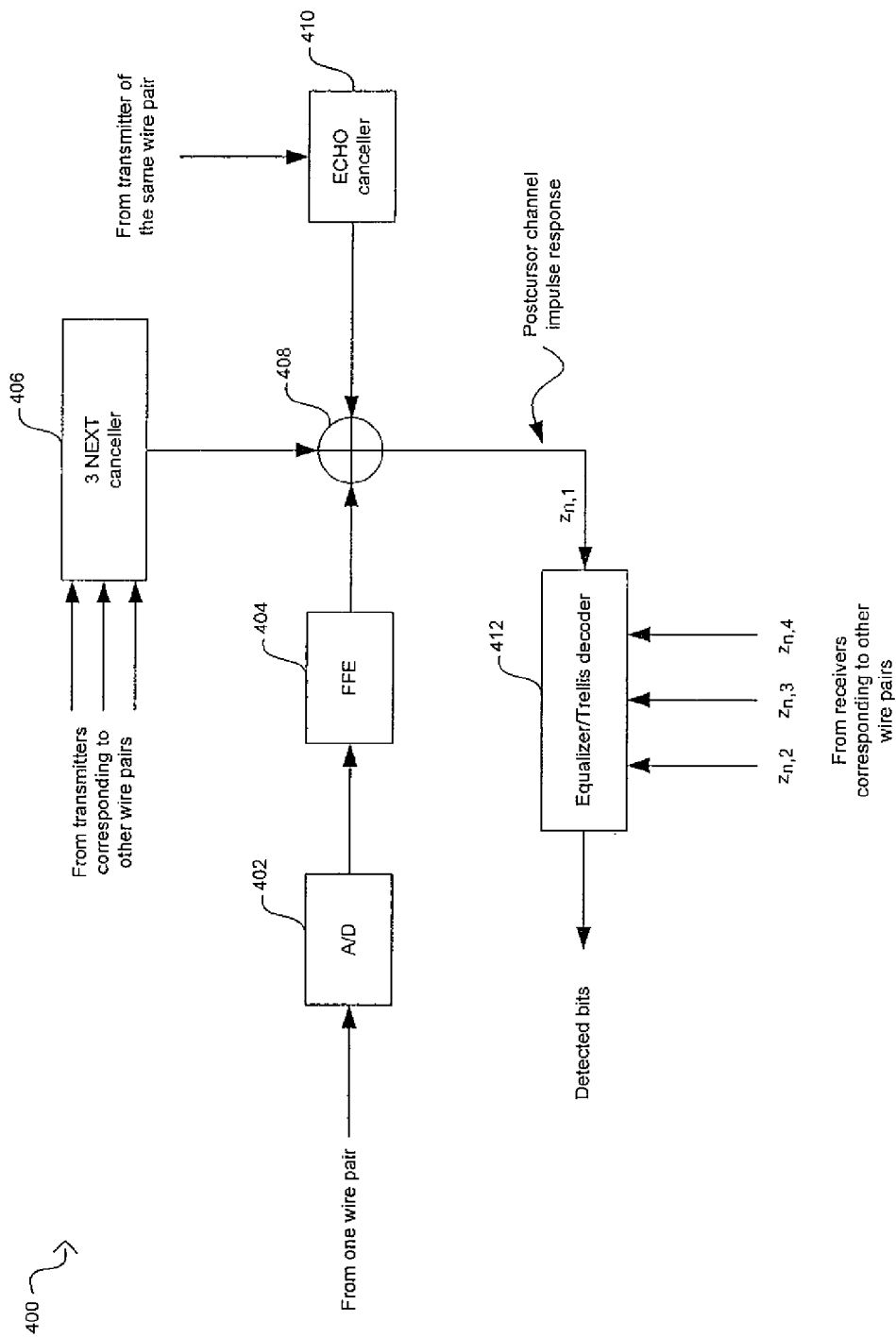
FIG. 4A is a block diagram illustrating exemplary signal processing operations on a received signal for Gigabit Ethernet, in connection with an embodiment of the invention.

FIG. 4A is a block diagram illustrating exemplary signal processing operations on a received signal for Gigabit Ethernet, in connection with an embodiment of the invention. Referring to FIG. 4A, there is shown a signal processing system 400 that may provide a portion of the signal processing performed by the physical (PHY) layer operations in an Ethernet transceiver. For example, the signal processing system 400 may be implemented in the multi-rate PHY block 212 and/or in the receivers 214*b*, 214*d*, 214*f*, and 214*h* in FIG. 2. The signal processing system 400 may comprise an analog-to-digital converter (ND) 402, an adaptive feed-forward equalizer (FFE) 404, a 3 NEXT canceller 406, an adder 408, an ECHO canceller 410, and an equalizer/trellis decoder 412.

The ND 402 may comprise suitable logic, circuitry, and/or code that may enable converting analog signals received via a twisted-pair wire into digital signals. The output of the A/D 402 may be communicated to the FFE 404. The FFE 404 may comprise suitable logic, circuitry, and/or code that may enable removal of precursor ISI to make the channel minimum-phase and to whiten the noise in the channel. The 3 NEXT canceller 406 may comprise suitable logic, circuitry, and/or code that may enable canceling at least a portion of the NEXT component received in the twisted-pair wire from the local transmitters corresponding to the three adjacent twisted-pair wires. The ECHO canceller 410 may comprise suitable logic, circuitry, and/or code that may enable canceling at least a portion of the ECHO component received in the twisted-pair wire from the local transmitter on the same twisted-pair wire.

The adder 408 may comprise suitable logic, circuitry, and/or code that may enable adding the output of the FFE 404, the 3 NEXT canceller 406, and/or the ECHO canceller to generate a postcursor channel impulse response, $z_{n,1}$. The equalizer/trellis decoder 412 may comprise suitable logic, circuitry and/or code that may enable equalizing the ISI that may result from the postcursor impulse response and decoding the trellis code. The equalizer/trellis decoder 412 may receive as inputs the postcursor channel impulse responses, $z_{n,2}$, $z_{n,3}$, and $z_{n,4}$ the corresponding to the other twisted-pair wires. The equalizer/trellis decoder 412 may generate the detected bits that correspond to the analog signal received.

FIG. 4B is a block diagram illustrating exemplary separate equalization and decoding operations for Gigabit Ethernet as described in FIG. 4A, in connection with an embodiment of the invention. Referring to FIG. 4B, there is shown the equalizer/trellis decoder 412 implemented as separate equalization and trellis decoding operations. The equalizer/trellis decoder 412 may comprise four decision-feedback equalizers (DFE) 420 and a trellis-coded modulation (TCM) decoder 422. The DFE 420 may comprise suitable logic, circuitry, and/or code that may enable removing the postcursor ISI for each twisted-pair wire. The TCM decoder 422 may comprise suitable logic, circuitry, and/or code that may enable executing a Viterbi algorithm on the code trellis to decode the trellis-coded symbols. The TCM decoder 422 may be implemented using a parallel decision-feedback decoding architecture, for example. The separate equalization and trellis decoding approach may provide low implementation complexity and the 1 Gbps data rate may be easily achieved.

FIG. 4C is a block diagram illustrating exemplary joint equalization and decoding operations for Gigabit Ethernet as described in FIG. 4A, in connection with an embodiment of the invention. Referring to FIG. 4C, there is shown the equalizer/trellis decoder 412 implemented as joint equalization and trellis decoding operations. The equalizer/trellis decoder 412 may comprise a decision-feedback prefilter (DFP) block 450 and a look-ahead parallel decision-feedback decoder (LA-PDFD) 452. The DFP block 450 may comprise four DFPs 454, one for each twisted-pair wire. The DFP 454 may comprise suitable logic, circuitry, and/or code that may enable shortening the postcursor channel memory. The LA-PDFP 452 may comprise suitable logic, circuitry, and/or code that may enable computing branch metrics in a look-ahead fashion. The training and adaptation of the channel coefficients may be utilized to improve the performance of the equalizer/trellis decoder 412 in FIG. 4D.

Figure 5A:
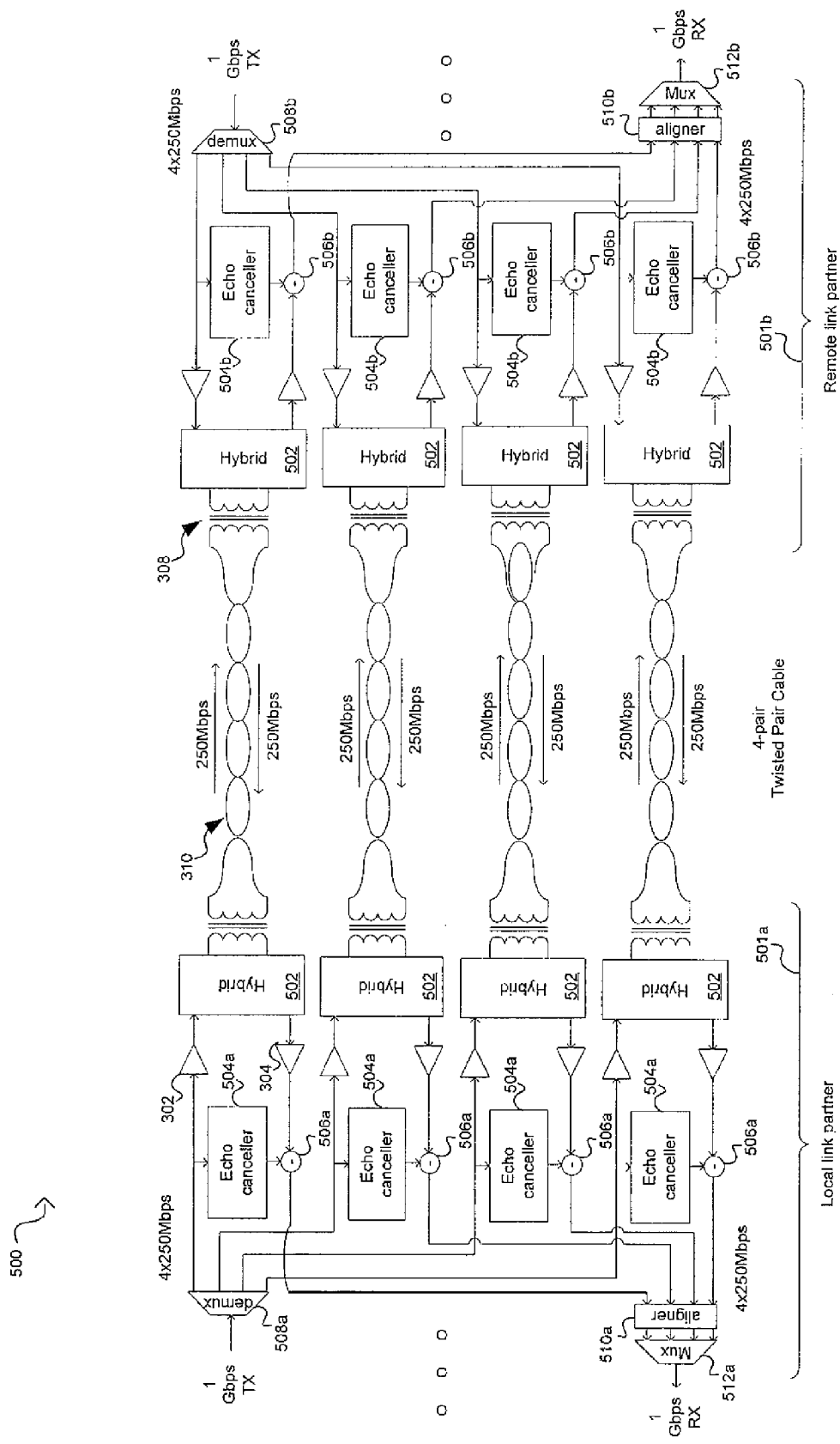
FIG. 5A is a block diagram of an exemplary Ethernet connection operating at 1000 Mbps over four-pair twisted-pair cabling, in connection with an embodiment of the invention.

FIG. 5A is a block diagram of an exemplary Ethernet connection operating at 1000 Mbps over four-pair twisted-pair cabling, in connection with an embodiment of the invention. Referring to FIG. 5A, there is shown an Ethernet system 500 operating at 1000 Mbps, or Gbps, that may comprise a local link partner 501a and a remote link partner 501b. The local link partner 501a and the remote link partner 501b may communicate via four twisted-pair wires 310 in full duplex operation. Each of the four twisted-pair wires 310 may support 250 Mbps data rates to provide an aggregate data rate of 1 Gbps. The local link partner 501a may comprise four hybrids 502. The operation of the hybrid 502 may be the same or substantially similar to the operation of the hybrid 302 in FIG. 3. Notwithstanding, the invention is not so limited and may support various implementations of a hybrid circuitry. Each hybrid 502 in the local link partner 501a may be communicatively coupled to a transmitter 302, a receiver 304, and to one of the four twisted-pair wires 310. Associated with each hybrid 502 in the local link partner 501a are also an echo canceller 504a and a subtractor 506a. The local link partner 501a may also comprise a demultiplexer (demux) 508a, an aligner 510a, and a multiplexer (mux) 512a.

Similarly, the remote link partner 501b may comprise four hybrids 502. Each hybrid 502 in the remote link partner 501b may be communicatively coupled to a transmitter 302, a receiver 304, and to one of the four twisted-pair wires 310. Associated with each hybrid 502 in the remote link partner 501b are also an echo canceller 504b and a subtractor 506b. The remote link partner 501b may also comprise a demux 508b, an aligner 510b, and a mux 512b. The portions of the local link partner 501a and remote link partner 501b shown in FIG. 5A may correspond to a portion of the physical (PHY) layer operations supported by the local link partner 501a and remote link partner 501b respectively.

The demuxes 508a and 508b may comprise suitable logic, circuitry, and/or code that may enable separating a 1 Gbps signal into four 250 Mbps signals for transmission over the four twisted-pair wires. The aligners 510a and 510b may comprise suitable logic, circuitry, and/or code that may enable aligning the 250 Mbps signals received from each of the four twisted-pair wires. The muxes 512a and 512b may comprise suitable logic, circuitry, and/or code that may enable combining the aligned 250 Mbps signals from the aligner 510 to generate a 1 Gbps received signal.

The echo cancellers 504a and 504b may comprise suitable logic, circuitry, and/or code that may enable processing the signal to be transmitted via a transmitter 302 to at least partially cancel the ECHO component in the corresponding signal received via the receiver 304 associated with the same twisted-pair wire. The subtractors 506a and 506b may comprise suitable logic, circuitry, and/or code that may enable canceling the ECHO component from the received signal.

In operation, the local link partner 501b may separate a 1 Gbps signal to be transmitted into four 250 Mbps signals via the demux 508a. Each signal to be transmitted is processed by a transmitter 302 before being communicated to the corresponding twisted-pair wire via a hybrid 502. The four transmitted signals may arrive at the remote link partner 501b where each may be processed by a receiver 304 before echo cancellation occurs from the operation of a corresponding echo canceller 504b and subtractor 506b. The four received 250 Mbps signals may be aligned in the aligner 510b before being combined in the mux 512b into a 1 Gbps received signal.

Similarly, the remote link partner 501*b* may separate a 1 Gbps signal to be transmitted into four 250 Mbps signals via the demux 508*b*. Each signal to be transmitted may be processed by a transmitter 302 before being communicated to the corresponding twisted-pair wire via a hybrid 502. The four transmitted signals may arrive at the local link partner 501*a* where each may be processed by a receiver 304 before echo cancellation occurs from the operation of a corresponding echo canceller 504*a* and subtractor 506*a*. The four received 250 Mbps signals may be aligned in the aligner 510*a* before being combined in the mux 512*a* into a 1 Gbps received signal.

Figure 5B:
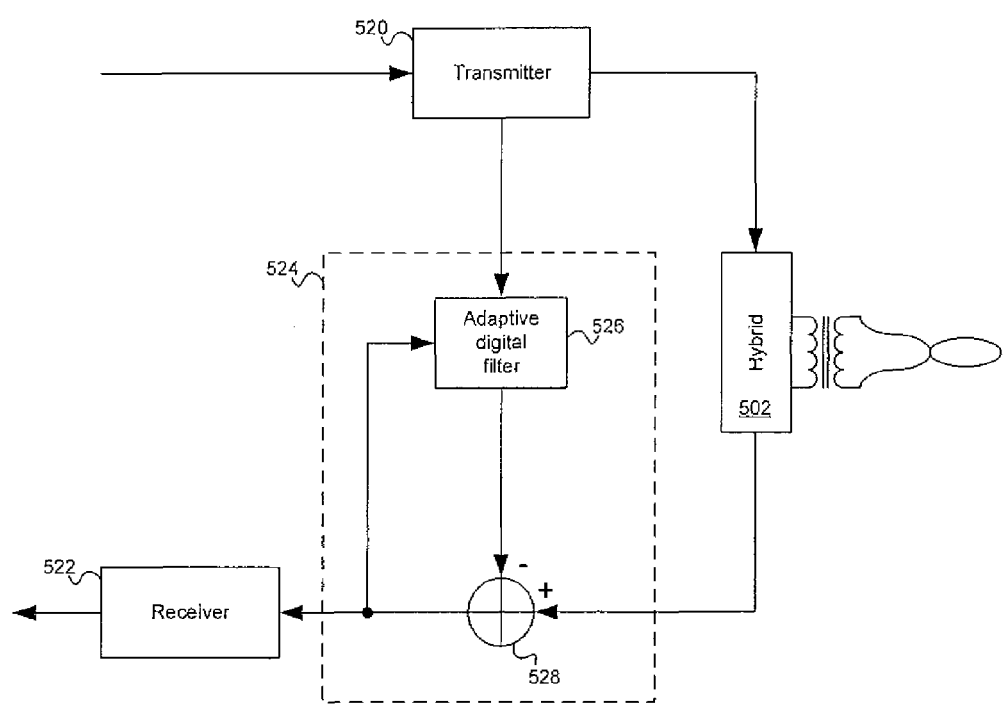
FIG. 5B is a block diagram of an exemplary echo canceller in a multi-rate PHY, in connection with an embodiment of the invention.

FIG. 5B is a block diagram of an exemplary echo canceller in a multi-rate PHY, in connection with an embodiment of the invention. Referring to FIG. 5B, there is shown an echo cancellation portion of a PHY layer operation for Gbps or 10 Gbps modes that comprises a transmitter 520, a receiver 522, a hybrid 502, and an echo cancellation block 524. The echo cancellation block 524 may comprise an adaptive digital filter 526 and a subtractor 528. The transmitter 520 may comprise suitable logic, circuitry, and/or code that may enable generating signals to be transmitted to a link partner at the other end of the link via the hybrid 502 and a corresponding twisted-pair wire. The receiver 522 may comprise suitable logic, circuitry, and/or code that may enable processing of echo-cancelled signals received from a link partner at the other end of the link via a corresponding twisted-pair wire and the hybrid 502.

The adaptive digital filter 526 may comprise suitable logic, circuitry, and/or code that may enable at least partial cancellation of the ECHO component of a received signal. In this regard, the adaptive digital filter 526 may utilize information regarding the transmitted and the received signals. The adaptive digital filter 526 may be an adaptive transversal digital filter that may implement a correlation algorithm, a stochastic iteration algorithm, and/or a sign algorithm, for example.

In operation, a signal is received via the hybrid 502. The adaptive digital filter 526 may utilize information regarding signals being transmitted via the transmitter 520 to determine a noise component associated with the ECHO component to subtract from the received signal at the subtractor 528. The output of the subtractor 528 may be communicated to the receiver 522 and to the adaptive digital filter 526 to perform iterative echo cancellation operations.

Figure 6:
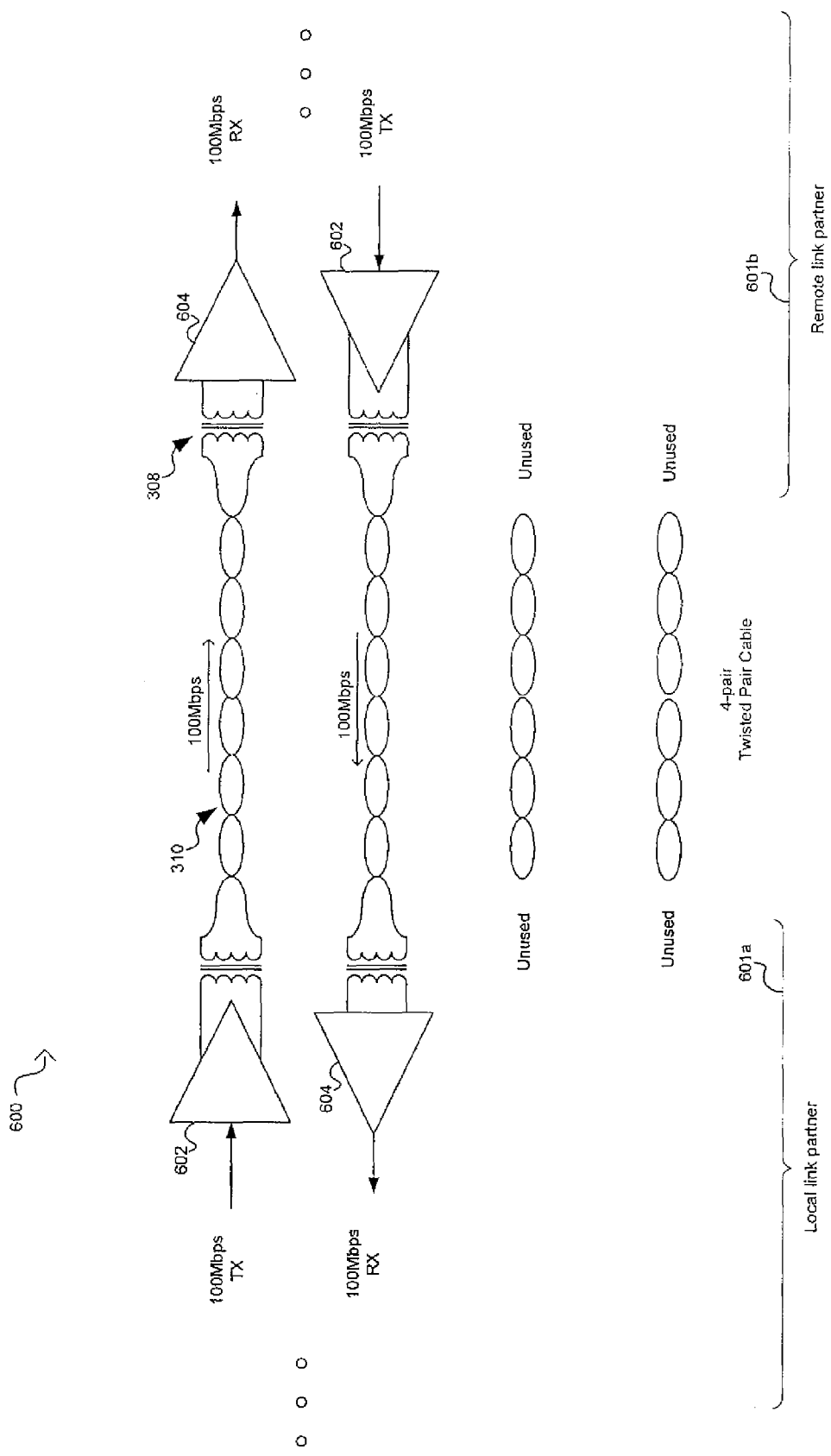
FIG. 6 is a block diagram of an exemplary Ethernet connection operating at 100 Mbps over two-pair twisted-pair cabling, in connection with an embodiment of the invention.

FIG. 6 is a block diagram of an exemplary Ethernet connection operating at 100 Mbps over two-pair twisted-pair cabling, in connection with an embodiment of the invention. Referring to FIG. 6, there is shown an Ethernet system 600 operating at 100 Mbps that may comprise a local link partner 601*a* and a remote link partner 601*b*. The local link partner 601*a* and the remote link partner 601*b* may communicate via two twisted-pair wires 310, wherein each twisted-pair wires is single directional. Transmission and reception operations are performed in separate twisted-pair wires. The two additional twisted-pair wires may remain unused. Each of the twisted-pair wires 310 in use may support 100 Mbps data rates in a single direction to provide an overall communication rate of 100 Mbps. The local link partner 601*a* may comprise a differential transmitter 602*a* and a differential receiver 604*a*. The remote link partner 601*b* may comprise a differential transmitter 602*b* and a differential receiver 604*b*.

The differential transmitters 602*a* and 602*b* may comprise suitable logic, circuitry, and/or code that may enable transmission over a twisted-pair wire. The differential transmitters 602*a* and 602*b* may, in some instances, transmit via a transformer 308 communicatively coupled to the transmitters. The differential receivers 604*a* and 604*b* may comprise suitable logic, circuitry, and/or code that may enable receiving signals from a twisted-pair wire. The differential receivers 604*a* and 604*b* may, in some instances, receive signals via a transformer 308 communicatively coupled to the receivers.

Figure 7:
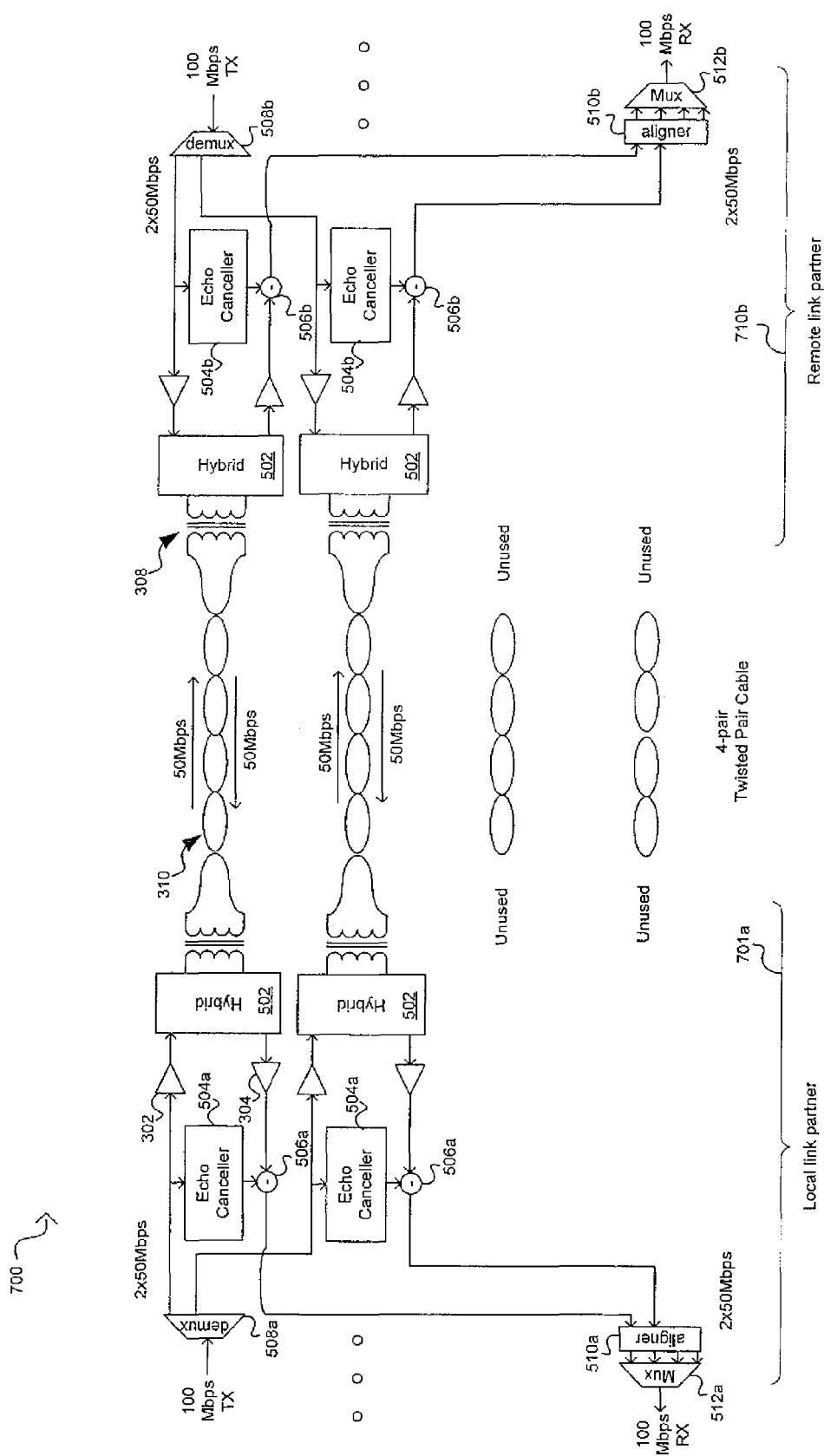
FIG. 7 is a block diagram of a reuse of Gigabit signal processing resources in a multi-rate Ethernet transceiver to operate in a two-pair 100 Mbps extended range mode, in accordance with an embodiment of the invention.

FIG. 7 is a block diagram of a reuse of Gigabit signal processing resources in a multi-rate Ethernet transceiver to operate in a two-pair 100 Mbps extended range mode, in accordance with an embodiment of the invention. Referring to FIG. 7, there is shown a multi-rate Ethernet system 700 that may comprise a local link partner 701*a* and a remote link partner 701*b*. The multi-rate Ethernet system 700 may support 1000 Mbps transmission, similar to the Ethernet system 500 in FIG. 5A. The multi-rate Ethernet system 700 may also support other modes of operation, such as 100 Mbps transmission rate over two-pair twisted-pair wire. In this regard, the multi-rate Ethernet system 700 may support a lower communication rate, such as 100 Mbps, while utilizing the signal processing operations available in the multi-rate PHY layer for processing the higher communication rate, such as 1 Gbps or 10 Gbps when available.

The local link partner 701*a* and the remote link partner 701*b* may communicate via two twisted-pair wires 310 in full duplex operation at 50 Mbps at each wire to provide an aggregate data rate of 100 Mbps. The local link partner 701*a* may utilize two hybrids 502 with corresponding echo canceller 504*a* and a subtractor 506*a*. The local link partner 701*a* may also utilize a demux 508*a*, an aligner 510*a*, and a mux 512*a* for transmission and reception of signals at the reduced communication rate of 100 Mbps. Similarly, the remote link partner 701*b* may utilize two hybrids 502 with corresponding echo canceller 504*b* and a subtractor 506*b*. The remote link partner 701*b* may also utilize a demux 508*b*, an aligner 510*b*, and a mux 512*b* for transmission and reception of signals at the reduced communication rate of 100 Mbps. The two remaining twisted-pair wires remain unused.

Reducing the communication rate from 1000 Mbps to 100 Mbps, for example, while utilizing the higher communication rate PHY layer signal processing operations may enable extending the range, that is, extending the standard length, of the twisted-pair wires 310. The higher communication rate PHY layer signal processing operations may comprise, for example, Gigabit echo cancellation and/or Gigabit equalization and trellis decoding. For example, the 100 m standard length supported by the IEEE 802.3 standard may be extended by reducing the communication rate that a multi-rate Ethernet transceiver may provide while utilizing the signal processing operations available within the Ethernet transceiver for higher communication rates such as 1 Gbps or 10 Gbps. Accordingly, a standard Gigabit 100 m PHY may be operated at 100 Mbps in a way that achieves a cable range that is much greater than 100 m. If the lower data communication rate is a standard IEEE 802.3 data rate, the standard Ethernet MAC interface remains unchanged. Notwithstanding, the invention is not so limited and may support various arbitrary data rates. An extended range PHY eliminates the necessity of costly additional switches to achieve longer than 100 m copper Ethernet connections in a way that is transparent to higher layers thus reducing overall network costs.

The multi-rate Ethernet system 700 need not be limited to achieving a lower communication rate of 100 Mbps by evenly distributing the data rate over each of the two twisted-pair wires utilized, that is, 50 Mbps per twisted-pair wire. In another embodiment of the invention, the multi-rate Ethernet system 700 may achieve a lower communication rate of 100 Mbps by distributing the data rate unevenly over each of the two twisted-pair wires utilized. For example, the first twisted-pair wire may support 75 Mbps while the second twisted-pair wire may support 25 Mbps, to achieve an aggregate of 100 Mbps. In this regard, the components in the local link partner 701*a* and/or the remote link partner 701*b* may be adapted to handle an unevenly distributed lower communication rate.

Figure 8:
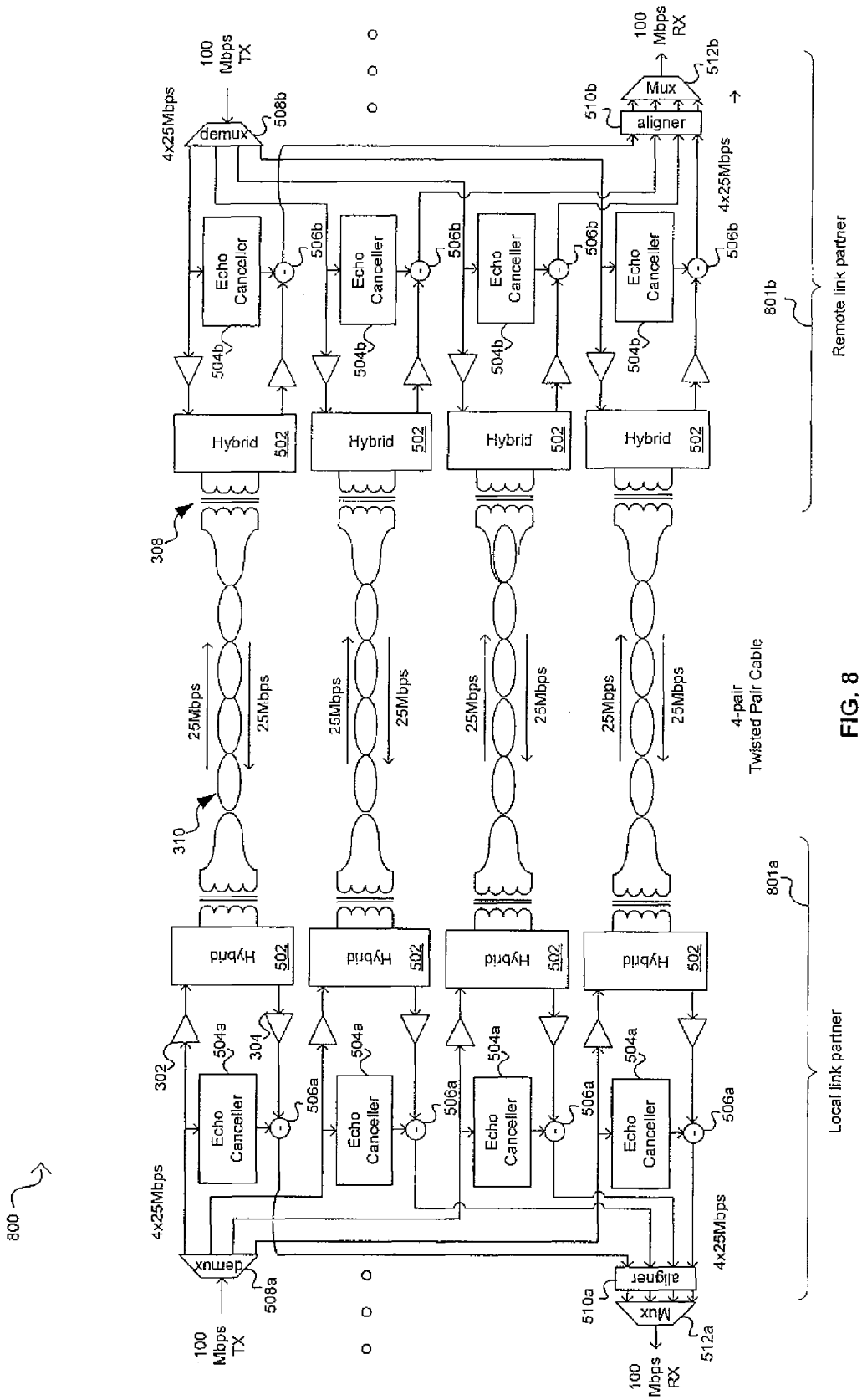
FIG. 8 is a block diagram of a reuse of Gigabit signal processing resources in a multi-rate Ethernet transceiver to operate in a four-pair 100 Mbps extended range mode, in accordance with an embodiment of the invention.

FIG. 8 is a block diagram of a reuse of Gigabit signal processing resources in a multi-rate Ethernet transceiver to operate in a four-pair 100 Mbps extended range mode, in accordance with an embodiment of the invention. Referring to FIG. 8, there is shown a multi-rate Ethernet system 800 that may comprise a local link partner 801*a* and a remote link partner 801*b*. The multi-rate Ethernet system 800 may support 1000 Mbps or Gbps communication, similar to the Ethernet system 500 in FIG. 5A. The multi-rate Ethernet system 800 may also support other modes of operation, such as 100 Mbps transmission rate over four-pair twisted-pair wire. In this regard, the multi-rate Ethernet system 800 may support a lower communication rate, such as 100 Mbps, while utilizing the signal processing operations available in the multi-rate PHY layer for processing the higher communication rate, such as 1 Gbps or 10 Gbps when available.

The local link partner 801*a* and the remote link partner 801*b* may communicate via four twisted-pair wires 310 in full duplex operation at 25 Mbps at each wire to provide an aggregate data rate of 100 Mbps. Reducing the communication rate from 100 Mbps to 25 Mbps, for example, while utilizing the higher communication rate PHY layer signal processing operations may enable extending the range, that is, extending the standard length, of the twisted-pair wires 310.

Gigabit PHY layer operations may utilize multi-level signaling to transmit multiple bits per clock interval. PAM-5 may be used to transmit 2 bits per symbol and reduce the symbol rate to carry on each twisted-pair wire 310. In this regard, multi-level signaling may be applied at 100 Mbps or 10 Mbps rates, that is, at lower communication rates, to permit operation at reduced symbol rates. For example, 25 Mbps may be carried on a single twisted-pair wire at a 12.5 Msps symbol rate. Reducing the symbol rate enables transmission over longer cable ranges. The signal processing operations available in a Gigabit PHY layer may support 2, 3, 4, or 5 levels of signaling with no increase in complexity, for example.

Reducing the communication rate may also enable utilizing cabling with higher insertion loss while maintaining the same standard length. For example, for Gigabit operations, a Category 5 cable may be utilized. Reducing the communication rate to 100 Mbps, for example, may enable utilizing cabling with higher insertion loss than a Category 5 cabling while maintaining the 100 m length requirement under the IEEE 802.3 standard. The insertion loss of a twisted-pair wire cable increases as the square root of frequency. Insertion loss, in dB, is directly proportional to cable length. Thus, a 100 m cable driven with a 125 Msps symbol rate, that is, 1000BASE-T, may have approximately the same insertion loss as a 100*sqrt(10)=316 m cable driven at a 12.5 Msps symbol rate for a PHY layer operating at 100 Mbps in extended range mode. Applying Gigabit signal processing operation at 100 Mbps data rate may increase the cable range by over 3 times, for example. NEXT cancellation operations also improve the SNR of each received signal and may be applied at 100 Mbps and 10 Mbps rates to achieve similar improvements in SNR and further extend the cable range at those reduced communication rates.

The multi-rate Ethernet system 800 need not be limited to achieving a lower communication rate of 100 Mbps by evenly distributing the data rate over each of the four twisted-pair wires utilized, that is, 25 Mbps per twisted-pair wire. In another embodiment of the invention, the multi-rate Ethernet system 800 may achieve a lower communication rate of 100 Mbps by distributing the data rate unevenly over each of the four twisted-pair wires utilized. For example, the first twisted-pair wire may support 10 Mbps, the second twisted-pair wire may support 20 Mbps, the third twisted-pair wire may support 30 Mbps, and the fourth twisted-pair wire may support 40 Mbps, to achieve an aggregate of 100 Mbps. In this regard, the components in the local link partner 801*a* and/or the remote link partner 801*b* may be adapted to handle an unevenly distributed lower communication rate.

Figure 9:
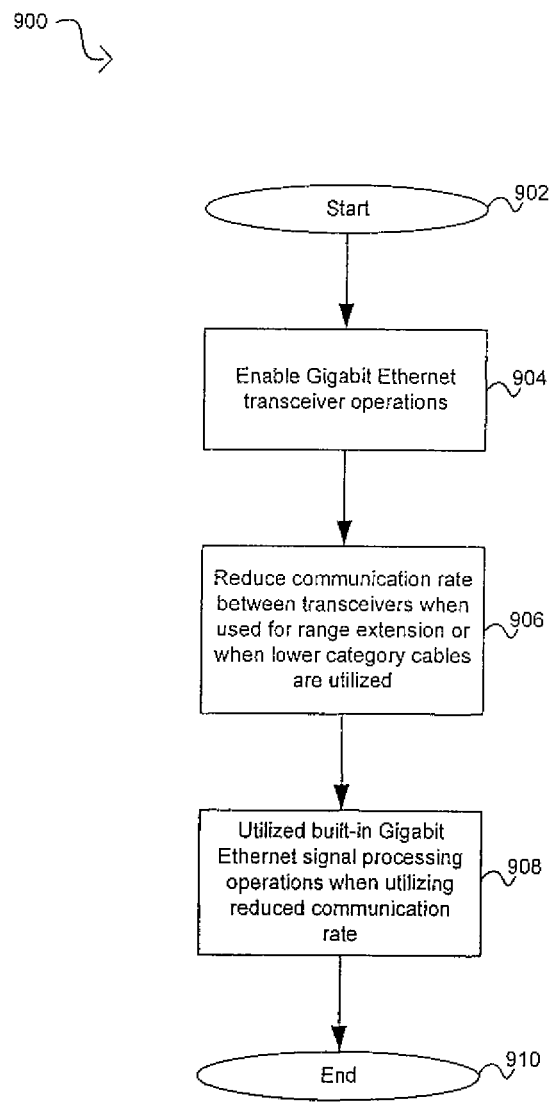
FIG. 9 is a flow diagram illustrating exemplary steps in communication rate reduction to achieve extended range for an Ethernet transceiver, in accordance with an embodiment of the invention.

FIG. 9 is a flow diagram illustrating exemplary steps in communication rate reduction to achieve extended range for an Ethernet transceiver, in accordance with an embodiment of the invention. Referring to FIG. 9, there is shown a flow diagram 900. After start step 902, in step 904, a Gigabit Ethernet transceiver may be enabled. The Gigabit Ethernet transceiver may utilize a multi-rate PHY layer that enables reducing the communication rate from 1 Gbps to a lower communication rate. The lower communication rate may be 100 Mbps or 10 Mbps, for example, but need not be so limited. The multi-rate PHY layer may also enable reducing the symbol rate for the Gigabit Ethernet transceiver. When reducing the communication rate or symbol rate, the multi-rate PHY layer enables the application of Gigabit signal processing operations to the reduced communication or symbol rate.

In step 906, an extended range mode may be enabled in the Gigabit Ethernet transceiver whereby the multi-rate PHY layer reduces the communication rate and/or the symbol rate. In step 908, at least a portion of the Gigabit signal processing operations available in the multi-rate PHY layer may be utilized during the extended range mode to enable the use of longer cables or to enable the use of higher insertion loss cables at the standard length. After step 908, the process may proceed to end step 910.

An Ethernet transceiver that support extended range via its PHY layer operations may facilitate the elimination of switches used purely as network extenders, thereby saving on cost. In addition, single pair operation may be utilized to replace VDSL equipment with less expensive Ethernet equipment. In accordance with various embodiments of the invention, various features for extended range may be built into a standard Gigabit PHY layer architecture with minimal overhead. This permits extended ranges applications to enjoy the cost reduction possible with a high volume part.

Various embodiments of the invention may be utilized to extend a range of IEEE standard rate PHYs such as 10 Mbps, 100 Mbps, 1000 Mbps, etc. The same techniques may be used to extend the range of any arbitrary rate. Applications for extend range Ethernet PHYs may comprise: backhaul, multi-tennant unit (MTU) FTTX+LAN, VDSL replacement, and generally any network using switches/hubs/repeaters to extend the range of a point-to-point connection to greater than 100 m.

An extended range PHY layer operations, or systems using the various embodiments of the invention, may provide special operation and management messages. For example, one method may utilize a scheme based on what has been proposed in the OAM clause of the IEEE 802.3ah standard, or an improved version thereof. This may enable service providers proper tools for network management and customer billing.

Accordingly, with minimal overhead or additional complexity, a single Gigabit Ethernet transceiver with multi-rate PHY layer may be used to enable extended range operations with programmable rates, number of wire pairs, aggregation, and cable ranges. While a multi-rate PHY layer may be utilized to enable extended range in Ethernet applications, the invention need not be so limited and other communication applications may also utilize a multi-rate PHY for range extension.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wired communication performed by one or more circuits in a multi-rate physical layer (PHY) device, the method comprising:
    enabling communication at a first communication rate over twisted pairs of a first category cable coupled to the multi-rate PHY device;
    reducing the first communication rate to a second communication rate when twisted pairs of a second category cable coupled to the multi-rate PHY device are enabled, the first and second category cables being different; and
    applying one or more signal conditioning operations corresponding to the first communication rate using the twisted pairs of first category cable to communication at the second communication rate using the twisted pairs of second category cable,
    wherein a subset of the twisted pairs of the second category cable is used in communications at the second communication rate.

2. The method of claim 1, wherein the twisted pairs of the second category cable have a greater insertion loss than the twisted pairs of the first category cable.

3. The method of claim 1, wherein the twisted pairs of the second category cable and the twisted pairs of the first category cable include unshielded twisted pairs.

4. The method of claim 1, wherein the twisted pairs of the second category and the twisted pairs of first category cable include copper.

5. The method of claim 1, wherein the second communication rate is evenly distributed over each twisted pair of the subset of twisted pairs of the second category cable.

6. The method of claim 1, wherein the second communication rate is unevenly distributed over each twisted pair of the subset of twisted pairs of the second category cable.

7. The method of claim 1, further comprising reducing a symbol rate of communication when the subset of twisted pairs of the second category cable is enabled.

8. The method of claim 1, wherein the signal conditioning operations associated with the first communication rate include at least one of an echo cancellation operation, a near-end cross talk (NEXT) cancellation operation, a far-end cross talk (FEXT) cancellation operation, and equalization operations.

9. The method of claim 1, wherein the multi-rate PHY device supports up to a 10 Gbps communication rate over 100 meters.

10. The method of claim 1, wherein the second communication rate enables the subset of twisted pairs of the second category cable to achieve a same communication range as the twisted pairs of the first category cable during communication at the first communication rate.

11. A multi-rate physical layer (PHY) device for wired communication, the multi-rate PHY device comprising:
    one or more circuits including at least one transceiver connected to a hybrid circuit and configured to:
        enable communication at a first communication rate over twisted pairs of a first category cable coupled to the multi-rate PHY device;
        reduce the first communication rate to a second communication rate when twisted pairs of a second category cable coupled to the multi-rate PHY device are enabled, the first and second category cables being different;
        apply one or more signal conditioning operations corresponding to the first communication rate using the twisted pairs of first category cables to communication at the second communication rate using the twisted pairs of the second category cable,
    wherein a subset of the twisted pairs of the second category cable is used in communications at the second communication rate.

12. The multi-rate PHY device of claim 11, wherein the twisted pairs of the second category cable have a greater insertion loss than the twisted pairs of first category cable.

13. The multi-rate PHY device of claim 11, wherein the twisted pairs of the second category cable and the twisted pairs of first category cable include unshielded twisted pairs.

14. The multi-rate PHY device of claim 11, wherein the twisted pairs of the second category cable and the twisted pairs of the first category include include copper.

15. The multi-rate PHY device of claim 11, wherein the second communication rate is evenly distributed over the subset of twisted pairs of the second category cable.

16. The multi-rate PHY device of claim 11, wherein the second communication rate is unevenly distributed over the subset of twisted pairs of the second category cable.

17. The multi-rate PHY device of claim 11, wherein the one or more circuits are further configured to reduce a symbol rate of communication when the subset of twisted pairs of the second category cable is enabled.

18. The multi-rate PHY device of claim 11, wherein the signal conditioning operations associated with the first communication rate include at least one of an echo cancellation operation, a near-end cross talk (NEXT) cancellation operation, a far-end cross talk (FEXT) cancellation operation, and equalization operations.

19. The multi-rate PHY device of claim 11, wherein the multi-rate PHY device supports up to a 10 Gbps communication rate over 100 meters.

20. The multi-rate PHY device of claim 11, wherein the second communication rate enables the subset of twisted pairs of the second category cable to achieve a same communication range as the twisted pairs of the first category cable during communication at the first communication rate.

* * * * *

UNITED STATES PATENT AND TRADEMARK OFFICE
CERTIFICATE OF CORRECTION

PATENT NO. : 9,537,781 B2
APPLICATION NO. : 14/137831
DATED : January 3, 2017
INVENTOR(S) : Bruce Conway et al.

Page 1 of 1

It is certified that error appears in the above-identified patent and that said Letters Patent is hereby corrected as shown below:

In the Claims

Column 14, Line 61, Claim 14, delete "include" after "category".

Signed and Sealed this
Ninth Day of October, 2018

Andrei Iancu
*Director of the United States Patent and Trademark Office*